United States Patent Office 3,222,295
Patented Dec. 7, 1965

3,222,295
CATALYST PREPARATION AND COMPOSITION
Harold E. Swift, Gibsonia, Pa., assignor to Gulf Research
 & Development Company, Pittsburgh, Pa., a corporation of Delaware
No Drawing. Filed Apr. 20, 1964, Ser. No. 361,236
14 Claims. (Cl. 252—429)

This invention relates to a process for preparing a dispersion from a solid complex and to said dispersion as a new composition of matter.

A titanium tetrahalide, such as titanium tetrachloride, can be reacted with a dialkylaluminum halide, such as diethylaluminum chloride, to form an alkylaluminum dihalide, such as ethylaluminum dichloride, a titanium trihalide, such as titanium trichloride, and alkyl radicals, such as ethyl, which readily disproportionate to an olefin and a hydrocarbon, such as ethylene and ethane, respectively. When the reaction is carried out in a solvent, such as hexane, the titanium trihalide obtained precipitates out of solution in the form of a fine precipitate. Depending upon the reaction conditions employed, alpha-, beta- or gamma titanium trichlorides are obtained. The mixture of titanium trihalide and alkylaluminum dihalide so produced can be employed as a catalyst for the polymerization of olefins, such as ethylene, propylene, etc. Unfortunately this mixture is highly reactive with air and moisture and great care must be exercised in its preparation and subsequent use.

In my copending application Serial No. 361,233, filed concurrently herewith and assigned to the same assignee as the present invention, I found that a solid complex could be prepared by reacting a titanium tetrahalide, such as titanium tetrachloride, with a dialkylaluminum halide, such as diethylaluminum chloride, in the presence of cyclohexane, the molar ratio of said titanium compound to said aluminum compound being from about 1.3:1 to about 2:1, preferably from about 1.3:1 to about 1.7:1, and the molar ratio of cyclohexane relative to the combined moles of said titanium compound and said aluminum compound being from about 32.20:1 to about 1.75:1, preferably from about 12.87:1 to about 6.44:1. Reaction conditions could include a temperature of about 10° to about 50° C., preferably about 20° to about 30° C., a pressure of about 15 to about 75 pounds per square inch gauge, preferably about 15 to about 30 pounds per square inch guage, and a reaction time of about five minutes to about 24 hours, preferably about five to about 10 minutes. The reaction was conducted in an inert atmosphere, such as nitrogen.

While in said application I believed that the solid complex was composed, for example, of a titanium trichloride, an alkylaluminum dichloride and cyclohexane, X-ray diffration studies indicated that the titanium trihalide present was different from the known alpha-, beta- and gamma titanium trichlorides, since the X-ray diffraction patterns obtained were different in each instance. Additionally, while the prior art reaction products of a titanium tetrahalide and a dialkylaluminum halide are highly reaction in air or moisture, the solid complex obtained in said copending application is only slightly reactive and can easily be handled in air with safety.

I have now found a new dispersion that can be employed as a catalyst for the polymerization of olefins can be obtained by reacting the solid complex obtained in said copending application with a trialkylaluminum. A particularly attractive feature involved in the preparation of the new catalyst system resides in the fact that while care must still be exercised in the handling of the trialkylaluminum, since it is highly reactive with air or moisture, no great care need be exercised in the handling of the solid complex reacted therewith, since it is not highly reactive in air or moisture. Accordingly, since one of the components of the reaction system, the trialkylaluminum compound is reactive in air or water, the reaction defined herein must be carried out in an inert medium, for example, nitrogen, argon, helium, etc.

The trialkylaluminum employed can be one wherein the alkyl portion thereof has from about one to about eight carbon atoms, preferably from about one to about three carbon atoms. Examples of trialkylaluminums that can be employed include trimethylaluminum, triethylaluminum, tripropylaluminum, trioctylaluminum, etc. Of these I prefer to employ triethylaluminum. The amount of trialkylaluminum required to obtain the desired dispersion, on a molar basis relative to the titanium tetrahalide employed to prepare the defined solid complex, must be at least about 0.25:1, preferably about 0.5:1 to about 1:1. The temperature required for reaction of the solid complex with the trialkylaluminum can be, for example, from about −20° to about 150° C., preferably about 50° to about 80° C., the pressure about 15 to about 75 pounds per square inch gauge, preferably about 15 to about 30 pounds per square inch gauge, and the reaction time about five to about 30 minutes, preferably about 10 to about 15 minutes. In order to facilitate the reaction and obtain the desired dispersion an inert solvent, such as a liquid hydrocarbon, can be employed. Examples of such solvents include cyclohexance, hexane, etc. The amount of solvent employed is not critical and need be enough only to facilitate the preparation of the desired dispersion. Thus, the solvent employed, on a volume basis compared to the solid complex can be at least about 15:1, but preferably is about 70:1 to about 135:1.

The reaction components include the solid complex, liquid trialkylaluminum and liquid hydrocarbon solvent. During reaction the mixture is stirred and the reaction product comprises a liquid containing fine solid particles dispersed therein. While I am not certain, I believe the dispersion so obtained contains solid titanium dihalide, liquid dialykylaluminum halide, liquid cyclohexane, liquid solvent (in cases wherein a solvent other than cyclohexane is employed during the reaction defined herein) and perhaps in some cases, solid titanium trihalide, unreacted liquid alkyluminmum dihalide and aluminum trichloride.

The invention can further be described by referencte to the following.

*Example I*

A solid complex was prepared in accordance with the procedure defined in Example I of my said copending application, specifically with reference to Run No. 3, in Table I therein. Briefly, the reaction system employed to form the solid complex included 3.0 cc. of cyclohexane, 0.3 cc. of $TiCl_4$ and 0.2 cc. of $Al(CH_2H_5)_2Cl$. To a 1000 milliliter stainless steel autoclave there was added, in air, and by hand, nine grams of the solid complex prepared above. The autoclave containing the solid complex was purged with nitrogen and then 450 milliliters of dry cyclohexane was added thereto, followed by the addition of 0.5 cc. of triethylaluminum. The pressure on the system during the reaction was maintained at 15 pounds per square inch gauge of nitrogen. The mixture was stirred and heated until the temperature reached 65° C. and the temperature of the reactor was held at such temperature for 15 minutes. Over a period of two hours there was introduced into the reactor propylene gas at a pressure of 100 pounds per square inch gauge. The reaction was stopped by cooling the reactor, exhausting the gas and adding methanol to the reaction mixture, and there was obtained, as identified by infrared, 19 grams of propylene polymer. The polymer had a crystalline melting point of 161° C. and was found to be 77 percent isotactic. The tacticity of the polymer was determined by subjecting duplicate samples thereof to a 24-hour extraction with boiling normal heptane.

That the catalyst system obtained herein is different from prior art catalyst systems and must be prepared using the solid complex defined in my copending application can be seen from the following.

*Example II*

To a one liter stainless steel autoclave that had been purged with nitrogen there was added 450 milliliters of dry cyclohexane. Successively 0.9 cc. of $TiCl_4$ and 0.6 cc. of diethylaluminum chloride was added to the autoclave. The contents of the autoclave was stirred for 10 minutes. At this point 0.5 cc. of triethylaluminum was added to the autoclave, and the resulting mixture stirred and heated at a temperature of 65° C. and a pressure of 15 pounds per square inch gauge of nitrogen for 15 minutes. Propylene was introduced into the autoclave at a pressure of 100 pounds per square inch gauge at a temperature of 65° C. The reaction was carried out for a period of two hours. At the end of this time no solid polymer of propylene was found.

To determine whether aging the reaction product of $TiCl_4$ and diethylaluminum chloride of Example I prior to the addition thereto of triethylaluminum would result in a catalyst system similar to the catalyst dispersion of this invention, the following experiment was carried out.

*Example III*

Into a specially made 25 cc. glass cell having a nitrogen atmosphere there was placed 0.6 cc. of diethylaluminum chloride, 0.9 cc. of $TiCl_4$ and 9 cc. of normal heptane. The contents of the reactor were permitted to remain at a temperature of 26° C. and a pressure of 15 pounds per square inch gauge for 24 hours. A two-phase system resulted from this operation. The contents of the glass cell was removed therefrom by the injection therein, with a hypodermic syringe and needle, of five 10 cc. samples of dry cyclohexane and forcing the resulting mixture by nitrogen pressure into a one liter stainless steel autoclave containing 450 cc. of dry cyclohexane. Triethylaluminum (0.5 cc.) was then added to the autoclave and the resulting mixture was stirred and heated to 65° C. and then maintained at 65° C. for 15 minutes.

Over a period of 1¾ hours propylene was added at a pressure of 100 pounds per square inch gauge. The temperature of the reactor was maintained at 65° C. The reaction was terminated by cooling the reactor, exhausting the gas and adding methanol to the mixture. There was obtained, as identified by infrared, 63 grams of propylene polymer. The crystalline phase of the polymer completely vanished at 161° C. as observed using a hot stage microscope with a polarizing unit. The polymer was found to be 63 percent isotactic. This was determined by subjecting duplicate samples thereof to a 24-hour extraction with boiling normal heptane.

From the above it can be seen that while aging helped to convert the reaction product of Example II into a propylene polymerization catalyst, the isotacticity of the propylene polymer obtained, 63 percent, was less than that obtained in Example I, 77 percent. This is additional evidence that the catalyst system of this invention is different from the catalyst systems of the prior art.

That the catalyst system obtained herein can be employed to polymerize ethylene can be seen from the following.

*Example IV*

Into a 500 milliliter flask there was added three grams of a solid complex identical to that employed in Example I and which had been handled in air. The flask before such addition contained 150 milliliters of dry normal heptane in a nitrogen atmosphere. To the flask there was added 0.2 cc. of triethylaluminum, and the mixture was stirred for 15 minutes at a temperature of 26° C. and a pressure of 15 pounds per square inch gauge. At the end of this time a dispersion of a fine black solid in a liquid resulted. A small amount of the dispersion was removed from the flask and was found to be highly reactive in air. Over a period of 15 minutes ethylene gas was passed into the flask while the contents thereof was maintained at 26° C. and 15 pounds per square inch gauge. At the end of this time 100 milliliters of methanol was added to the flask to stop the reaction. The polymer obtained, amounting to eight grams, was removed from the reaction mixture by filtration. Infrared proved the polymer to be polyethylene. Its crystalline melting point was found to be 132° C. When ethylene was subjected to the same conditions employed above in the presence of three grams of the solid complex alone no ethylene polymer was found.

Obviously, many modifications and variations of the invention, as hereinabove set forth, can be made without departing from the spirit and scope thereof, and therefore only such limitations should be imposed as are indicated in the appended claims.

I claim:

1. A process for producing a solid dispersion which consists essentially of reacting a titanium tetrahalide with a dialkylaluminum halide, wherein the alkyl portion thereof has from one to six carbon atoms, in the presence of cyclohexane, the molar ratio of said titanium compound to said aluminum compound being from about 2:1 to about 1.3:1 and the molar ratio of cyclohexane relative to the combined moles of said titanium compound and said aluminum compound being from about 32.20:1 to about 1.75:1 to obtain a solid complex and thereafter reacting said solid complex with a trialkylaluminum wherein the alkyl portion thereof has from one to eight carbon atoms to obtain a dispersion of a solid in a liquid.

2. A process for producing a solid dispersion which consists essentially of reacting a titanium tetrahalide with a dialkylauminum halide, wherein the alkyl portion thereof has from one to six carbon atoms, in the presence of cyclohexane, the molar ratio of said titanium compound to said aluminum compound being from about 1.3:1 to about 1.7:1 and the molar ratio of cyclohexane relative to the combined moles of said titanium compound and said aluminum compound being from about 12.87:1 to about 6.44:1 to obtain a solid complex and thereafter reacting said solid complex with a trialkylaluminum wherein the alkyl portion thereof has from one to eight carbon atoms to obtain a dispersion of a solid in a liquid.

3. A process for producing a solid dispersion which consists essentially of reacting a titanium tetrahalide with a dialkylaluminum halide, wherein the alkyl portion thereof has from one to six carbon atoms, in the presence of cyclohexane, the molar ratio of said titanium compound to said aluminum compound being about 1.5:1 and the molar ratio of cyclohexane relative to the combined moles of said titanium compound and said aluminum compound being from about 12.87:1 to about 6.44:1 to obtain a solid complex and thereafter reacting said solid complex with a trialkylaluminum wherein the alkyl portion thereof has from one to eight carbon atoms to obtain a dispersion of a solid in a liquid.

4. A process for producing a solid dispersion which consists essentially of reacting titanium tetrachloride with dialkylaluminum chloride, wherein the alkyl portion thereof has from one to six carbon atoms, in the presence of cyclohexane, the molar ratio of said titanium compound to said aluminum compound being from about 2:1 to about 1.3:1 and the molar ratio of cyclohexane relative to the combined moles of said titanium compound and said aluminum compound being from about 32.20:1 to about 1.75:1 to obtain a solid complex and thereafter reacting said solid complex with triethylaluminum to obtain a dispersion of a solid in a liquid, the molar ratio of said triethylaluminum wherein the alkyl portion thereof has from one to eight carbon atoms relative to said titanium compound being at least about 0.25:1.

5. A process for producing a solid dispersion which consists essentially of reacting titanium tetrachloride with diethylaluminum chloride in the presence of cyclohexane, the molar ratio of said titanium compound to said aluminum compound being from about 2:1 to about 1.3:1 and the molar ratio of cyclohexane relative to the combined mols of said titanium compound and said aluminum compound being from about 32.20:1 to about 1.75:1 to obtain a solid complex and thereafter reacting said solid complex with triethylaluminum to obtain a dispersion of a solid in a liquid, the molar ratio of said triethylaluminum relative to said titanium compound being at least about 0.25:1.

6. A process for producing a solid dispersion which consists essentially of reacting titanium tetrachloride with dialkylaluminum chloride, wherein the alkyl portion thereof has from one to six carbon atoms, in the presence of cyclohexane, the molar ratio of said titanium compound to said aluminum compound being from about 1.3:1 to about 1.7:1 and the molar ratio of cyclohexane relative to the combined moles of said titanium compound and said aluminum compound being from about 32.20:1 to about 1.75:1 to obtain a solid complex and thereafter reacting said solid complex with triethylaluminum to obtain a dispersion of a solid in a liquid, the molar ratio of said triethylaluminum wherein the alkyl portion thereof has from one to eight carbon atoms relative to said titanium compound being from about 0.25:1 to about 1:1.

7. A process for producing a solid dispersion which consists essentially of reacting titanium tetrachloride with dialkylaluminum chloride, wherein the alkyl portion thereof has from one to six carbon atoms in the presence of cyclohexane, the molar ratio of said titanium compound to said aluminum compound being about 1.5 and the molar ratio of cyclohexane relative to the combined moles of said titanium compound and said aluminum compound being from about 32.20:1 to about 1.75:1 to obtain a solid complex and thereafter reacting said solid complex with triethylaluminum to obtain a dispersion of a solid in a liquid, the molar ratio of said triethylaluminum wherein the alkyl portion thereof has from one to eight carbon atoms relative to said titanium compound being from about 0.25:1 to about 1:1.

8. The composition resulting from the process of claim 1.

9. The composition resulting from the process of claim 2.

10. The composition resulting from the process of claim 3.

11. The composition resulting from the process of claim 4.

12. The composition resulting from the process of claim 5.

13. The composition resulting from the process of claim 6.

14. The composition resulting from the process of claim 7.

References Cited by the Examiner

UNITED STATES PATENTS 3,058,963   10/1962   Vandenberg _____ 252—429

TOBIAS E. LEVOW, *Primary Examiner.*